July 19, 1949.  F. SCHÄFER  2,476,388
SPOON-BAIT
Filed Oct. 9, 1946
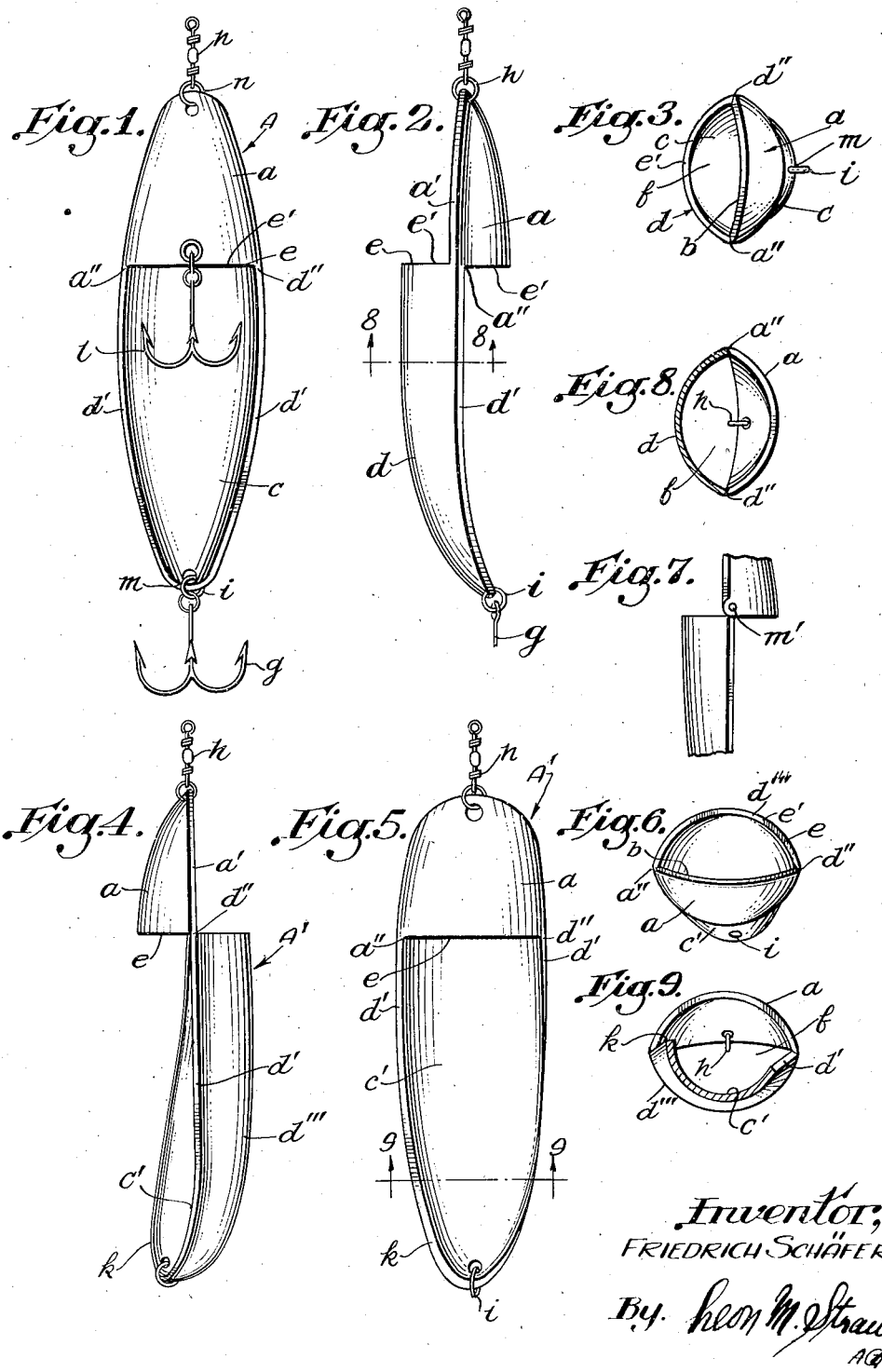
Inventor,
FRIEDRICH SCHÄFER.
By Leon M. Straus
Att.

Patented July 19, 1949

2,476,388

UNITED STATES PATENT OFFICE 2,476,388

SPOON BAIT

Friedrich Schäfer, St. Gallen, Switzerland

Application October 9, 1946, Serial No. 702,315
In Switzerland October 31, 1945

4 Claims. (Cl. 43—42.06)

The present invention relates to a spoon-bait. It is one of the objects of the invention to provide means permitting fish-like motions (wobbling, spinning, rotating) of the spoon-bait. Another object of the invention is to provide means facilitating a streamlined shape of said spoon-bait, the same being characterized in that one of the two surfaces of same has at least one arch running in the horizontal direction of the spoon and appearing as a groove on the other surface, whereby the crossing from the highest position of the arch or the lowest position of the groove on one surface to the corresponding position on the other surface is effected suddenly—the contours of the arch, or of the groove, forming a hole at the crossing, all this being arranged for the purpose of shaping the spoon in such a way that after the fishing line has been cast it is thus made to sink quickly and when drawing in the fishing line the spoon is held firm, despite currents, at practically uniform depths of water and in a steady movement having a striking resemblance to the movement of small fish swimming in water.

The invention is illustrated on the attached drawing by various examples in finish, wherein: Figs. 1 to 3 and 8 give the first description of construction, Figs. 4 to 6 and 9 the second, and Fig. 7, exemplifying the third example, illustrates a variation in detail of the first two examples. Figs. 1 and 5 are in plan. Figs. 2, 4 and 7 are side elevations and Figs. 3 and 6 are end views. Figs. 8 and 9 are cross-sectional views taken on lines 8—8 and 9—9, respectively.

In Figs. 1 to 6 of the attached drawing, $a$ is an outwardly curved, hollow section which is made of tin. This curved or arch-shaped section forms a groove on the opposite face of the spoon-bait. $c$ is a groove formed in outwardly curved section $d$ on the opposite side of the spoon-bait. Sections $a$ and $d$ taper down in opposite directions toward the outermost ends $m$, $n$ of the spoon-bait. The crossing from the lowest position of the groove or the highest position of the arch on one section to the corresponding position on the other section is sudden and is effected at position $e$ and the contours of the arch or of the groove form opening $f$ of the spoon-bait. Section $a$ is kept shorter than section $d$ from which it is separated by opening or hole $f$, whereas vice-versa, groove $c$ is longer than groove $b$. At the longer end of the spoon-bait, at $i$, the hook $g$ is attached, which serves as the device for catching fish. Besides this, a second hook $l$ can also be attached to the shorter end of the spoon-bait. But this can be dispensed with. Furthermore, at the top end of the spoon-bait, there is a link, denoted by the letter $h$, to which the fishing line—which is not illustrated on the drawing—is attached. Section $d$, furthermore, has a horizontal curvature to such a degree that the fixtures for fastening the fishing line and hook, $h$ and $l$— as can be observed in Figs. 2 and 4—are not in the same vertical plane.

In the second illustrated drawing, according to Figs. 4 to 6, and 9, in spoon-bait A', the longer groove $c'$ is turned round the horizontal axis of the spoon, by which a one-sided raised edge $k$ is formed whereby a tailing or spinning motion of the spoon in the water is achieved. The longer arch is denoted by $d'''$.

The embodiment illustrated in Fig. 7 is based on a type of construction of the spoon-bait by which the longer part of same—in relation to the shorter part—is so fixed by a hinge as to be movable. In this way, the spoon-bait, when submerged in water, is given a still further freedom of movement by reason of the fact that the two parts, connected by a movable joint, may move towards each other. The hinges are illustrated in Fig. 7 with the letter $m'$.

The spoon-bait can, for example, be covered with a kind of copper coat on the one side and on the other side it can have a polished nickel-plated surface which, when submerged in water, gives it an iridescent appearance. The size of the spoon-bait itself can vary within certain limits.

It can thus be seen, that there has been provided according to the invention a fish lure or spoon-bait which comprises an elongated body A provided with two oppositely directed, outwardly curved, hollow sections $a$ and $d$, said sections terminating each in two respective side edges $a'$, $d'$, bridge portions $a''$, $d''$ interconnecting adjacent side edges of said sections $a$, $d$, each of said sections having an outer end $m$, $n$ and an inner end $e'$, said sections $a$, $d$ tapering from their ends $e'$ toward their respective outer ends $m$, $n$ and terminating at their respective inner ends $e'$ in complementary circular wall edges $e$ which define together with said bridge portions $a''$, $d''$ a substantially oval-shaped opening $f$ to permit liquid passage therethrough, one of said sections $a$ being shorter in length than the other section $d$, said wall edges $e$ lying in a plane at right angles to the longitudinal axis of said body A, one of said outer ends $m$ being offset with respect to said longitudinal axis, each section being provided with a continuously curved inner wall $c$, $b$ which increases in area toward said opening $f$ whereby said curved inner walls $c$, $b$ are further spaced from said longitudinal axis at the location of said wall edges of said opening $f$ than at locations adjacent to said outer ends $m$, $n$, respectively.

Having thus described the invention, what is claimed as new and desired to be secured by Letters Patent, is:

1. A spoon-bait comprising an elongated body provided with two oppositely directed, outwardly curved, hollow sections, said sections terminating each in two respective side edges, and bridge portions interconnecting adjacent side edges of said sections, each of said sections having an outer end and an inner end, said sections tapering from their inner ends toward their respective outer ends and terminating at their respective inner ends in complementary circular wall edges which define together with said bridge portions a substantially oval-shaped opening to permit liquid passage therethrough, one of said sections being shorter in length than the other section, said wall edges lying in a plane at right angles to the longitudinal axis of said body, one of said outer ends being offset with respect to said longitudinal axis, and each section being provided with a continuously curved inner wall which increases in area toward said opening whereby said curved inner walls are further spaced from said longitudinal axis at the location of said wall edges of said opening than at the locations adjacent to said outer ends, respectively.

2. A spoon-bait according to claim 1, wherein said side edges of said other section are out of alignment with respect to each other and with respect to said longitudinal axis.

3. A spoon-bait according to claim 1, wherein said side edges of one of said sections extend at different levels with respect to each other so that one of the edges provides a raised flank with respect to the other.

4. A spoon-bait according to claim 1, wherein said complementary circular wall edges are pivotally attached to each other at said bridge portions, respectively.

FRIEDRICH SCHÄFER.

REFERENCES CITED

The following references are of record in the file of this patent:

UNITED STATES PATENTS

| Number | Name | Date |
| --- | --- | --- |
| 1,871,377 | Khoenle | Aug. 9, 1932 |
| 1,903,256 | Catarau | Mar. 28, 1933 |
| 1,914,211 | Novitzky | June 13, 1933 |
| 2,180,918 | Verzi | Nov. 21, 1939 |
| 2,435,932 | Smith | Feb. 10, 1948 |